(12) United States Patent
Habel et al.

(10) Patent No.: US 6,592,273 B1
(45) Date of Patent: Jul. 15, 2003

(54) OUT-OF-BAND VEHICLE FOR OPTICAL CHANNEL OVERHEAD INFORMATION

(75) Inventors: Richard Achille Habel, Kanata (CA); Alan Glen Solheim, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/296,291

(22) Filed: Apr. 22, 1999

(51) Int. Cl.[7] ............... H04B 10/00; H04B 10/04; H04B 10/06; H04J 1/00; H04L 12/28
(52) U.S. Cl. ............... 398/140; 398/182; 398/155; 398/202; 370/487; 370/524; 370/907
(58) Field of Search ............... 370/496, 524, 370/487, 907; 375/295; 359/152, 154, 180, 189

(56) References Cited

U.S. PATENT DOCUMENTS

| | | | | |
|---|---|---|---|---|
| 4,451,916 A | * | 5/1984 | Casper et al. ............... | 370/16 |
| 5,430,733 A | * | 7/1995 | Takasaki ............... | 370/110.4 |
| 5,710,650 A | * | 1/1998 | Dugan ............... | 359/133 |
| 5,719,923 A | * | 2/1998 | Bremer et al. ............... | 379/100 |
| 6,134,033 A | * | 10/2000 | Bergano et al. ............... | 359/122 |
| 6,243,369 B1 | * | 6/2001 | Grimwood et al. ............... | 370/335 |

* cited by examiner

*Primary Examiner*—Leslie Pascal
*Assistant Examiner*—M. R. Sedighian
(74) *Attorney, Agent, or Firm*—Jeffrey M. Measures

(57) ABSTRACT

An out of band vehicle for an optical network is used for transporting overhead (OH) data between 3R network elements, irrespective of the format or/and rate of the OH data. At the first 3R network element, the OH data is up-converted at a frequency $f_{ch}$, and the resulting signal is combined with the traffic and transmitted to a second 3R network element. The inverse operation is effected at the second 3R network element by down-converting the combined signal. The frequency $f_{ch}$ is selected to be in a null of the traffic spectrum, so as to not interfere with the traffic.

10 Claims, 1 Drawing Sheet

OUT-OF-BAND VEHICLE FOR OPTICAL CHANNEL OVERHEAD INFORMATION

BACKGROUND OF THE INVENTION

1. Field of the Invention

This invention is directed to an optical out-of band vehicle for transporting optical channel overhead information.

2. Background Art

Traditionally, the performance of synchronous optical networks is monitored using bytes with specific assignation, carried in an overhead associated with the payload. For example, the information in the SONET transport overhead (TOH) is used by the SONET equipment for control and signalling purposes. Thus, TOH comprises fields indicating the order of the tributaries into a higher rate signal, error check fields, frame alignment information, administrative error fields and signalling information.

Signalling in SONET may be accomplished using a 3-Byte data communication channel (DCC) field in the section overhead that provides a 192 Kb/s message channel used from a central location for operation, administration and maintenance (OAM) between section entities. Section entities are for example optical amplifiers and repeaters. A 9-Byte DCC field is also provided in the line overhead, that offers a 576 Kb/s message channel for OAM information between line entities. Line entities are for example add/drop multiplexers.

The DCC channels are available for internally generated, externally generated and manufacturer specific messages, such as alarms, controls, OAM and other communication needs.

As the synchronous networks evolved to carry payloads with various types of traffic (e.g ATM, IP), the amount of overhead information (OH) also evolved. The overhead information includes optical channel overhead information (OCH), optical multiplex overhead information and optical transport overhead.

As a result of these requirements, additional ways of conveying the OH information were proposed and some are in use. For example, a known way of transporting OH information is to use an in-band optical service channels (OSC), which can have a unidirectional or a bidirectional implementation. An OSC is used exclusively between two sites equipped with optical amplifiers, to carry optical section transport overhead information, and it has a rate of 4.86 Mb/s.

It is also known to use wavelength identifiers for each channel, to partially verify connectivity at optical multiplexers. This is done, for example, by on-off keying of a dither to modulate the optical signal at a low rate. The same dither also provides sometimes information about the power of the respective channel.

However, while the above solutions are suitable to manage the current opaque SONET networks, they cannot accommodate the amount of information needed for overhead of next generation of optical transparent networks.

As the service channels are carried in-band for SONET/SDH systems, the timing information is available at the ends of the channel, so that the data can be used without additional clock circuitry. However, a service channel may not be in band for other type of signals than SONET, which means that additional clock circuitry must be provided at the nodes where the information carried by the service channel is needed. This is an important deterrent for the emerging transparent networks.

Co-pending patent application Ser. No. 09/218053, filed on Dec. 2, 1998 by Northern Telecom Limited and entitled "Apparatus and method for versatile digital communication" (Habel et al.) discloses a simple phase locked loop (PLL), that enables clock recovery for any bit-rate and operates over a broad continuous range of frequencies. The PLL may be used to provide 3R transponder/regenerators with read/write access to overhead data, eye quality assessment, monitoring/identification of the bit-rate of the signal, and with bit-rate independent digital multiplexing and demultiplexing functions. Such a frequency agile 3R transponder/regenerator may also enable use of a high-speed out-of band vehicle for transporting the optical channel overhead. The above-identified patent application is incorporated herein by reference.

SUMMARY OF THE INVENTION

It is an object of the present invention to provide a high-speed out-of band vehicle for communicating overhead information between network entities of a transparent optical network, that alleviates totally or in part the drawbacks of the prior art solutions.

The main advantage of this out-of band vehicle is that it allows management of next generation optical transparent networks with at least the same rich features used today to manage opaque SONET networks.

The out-of-band vehicle for OH data can be readily used with the transparent receivers, transceivers or transponders described in the patent application Ser. No. 09/218053, providing for network elements that may be managed with minimal interference with the payload. In addition, as there are no restrictions on the format and rate of the OH data, a network provider is granted the option of selecting the type and amount of OAM&P operations it wishes.

Still another advantage of the out-of-band vehicle for OH data is that the interference with the payload is minimal, the clock recovery is simple and there are few additional components needed to implement this service channel.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

A 3R unit is a network element, which Recovers, Reshapes, and Re-times an optical signal. Such a unit could be for example an optical receiver, or a transceiver, which includes an optical receiver for recovering the data, amplifiers for reshaping the data and synchronizers for re-timing.

As well, a 3R unit could be a transponder. In the current network architectures, a transponder comprises on-ramp circuits (SR receiver and DWDM transmitter) and the off-ramp circuits (the DWDM receiver and the SR transmitter). The advantage of this integration is that communication between short reach and DWDM logic is internal to the transponder. Also, this integration results in important savings on the equipment at the node, in that it reduces the support circuitry (PUPS, microprocessors, etc) and accordingly the number of slots occupied by a channel.

Figure 1:
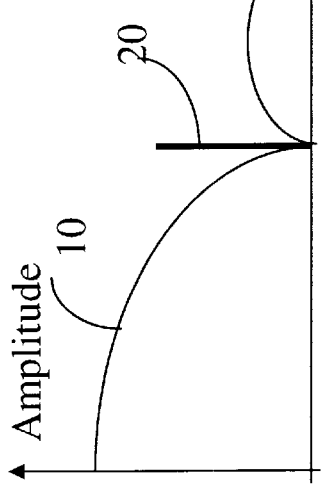
FIG. 1 shows the overhead carrier tone in relation with the data spectrum.

FIG. 1 shows the spectrum (amplitude versus frequency) for NRZ data at 10, and the overhead channel frequency at 20. The frequency $f_{ch}$ of the NRZ data is always situated in a null of the data spectrum for minimum cross talk. For example, in a SONET OC-48 network, the data rate is 2.5 Gb/s, and therefore, OC-48 has a spectral null at the 2.5 GHz frequency.

It is to be understood that the invention is applicable to NRZ encoded data and to multi-level encoded data, etc, which have a spectrum of the type shown in FIG. 1. As such, the invention cannot be applied to RZ encoded data.

The term overhead defines herein any service information regarding the associated traffic channels. For example overhead information may include, but is not limited to, information currently transmitted on SONET/SDH DCC channels, order wire, auto-protection switching (AIS), source and destination addresses, packet header information, out-of-band forward error correction information, SW downloading, etc.

According to the present invention, the overhead information is transposed, up at the transmitter side, and down at the receiver side, to a frequency equal to $f_{ch}$. In this way, OH data of any format and rate is transported in the network without special provisions. This also results in minimum cross-talk, as the overhead data is in a null of the traffic data.

Figure 2:
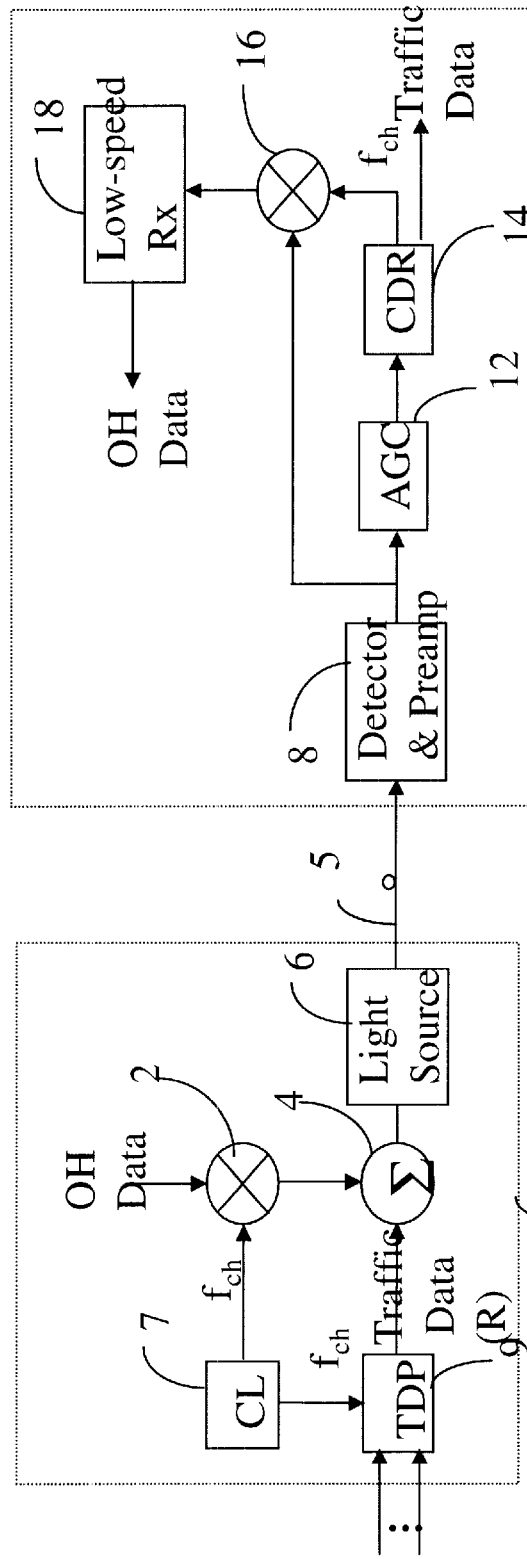
FIG. 2 is a block diagram of the path of the overhead information carried in an out-of-band vehicle between the transmitter and receiver sides of a communication link.

FIG. 2 shows a block diagram of the implementation of the out-of-band vehicle according to the invention. Only the transmit side of a first 3R unit 1 and the receive side of a second 3R unit 3 are shown, and the transmission link between units 1 and 3, which is in this case optical fiber 5.

As discussed above, in general, a 3R unit is provided with timing circuitry for synchronization, which include circuits for re/generating the clock, including the OH frequency $f_{ch}$.

At the transmit side of 3R unit 1, the overhead data denoted with "OH Data" is mixed with frequency $f_{ch}$ in a mixer 2, which results in upconverting the OH data around frequency $f_{ch}$. This frequency is generated with the clock circuit 7 which could be of the type disclosed in the above-mentioned patent application Ser. No. 09/218053.

The traffic data is obtained by conventional processing of the data to be transmitted from unit 1 to unit 3, as illustrated by the block traffic data processor (TDP) 9. This includes conventional multiplexers, amplifiers, modulators, that process the incoming and the local client signals to provide traffic data of a certain rate R.

A summing circuit 4 combines the traffic data with the up-converted OH data, resulting in a frequency spectrum as shown in FIG. 1. A light source 6 converts the summation of traffic and overhead data from an electrical variant into an optical variant and launches the combined signal over link 5 towards the second 3R unit 3, in optical format.

At the receive side of the second 3R unit 3, the optical input signal is first re-converted to an electrical variant and amplified with detector and preamplifier unit 8. The bandwidth of unit 8 must be known and controlled at a frequency equal to the maximum bit rate.

The data and clock signals are recovered next with clock and data recovery (CDR) unit 14. The OH data is extracted by performing down-converting the OH data from $f_{ch}$ using a mixer 16. Mixer 16 receives the clock frequency $f_{ch}$ and the combined traffic and OH data from the output of detector and preamplifier unit 8. A low speed receiver 18 then recovers the OH data. Automatic gain control (AGC) block 12 is conventionally used at the receive side of a 3R network element.

Mixers and summing circuits needed for performing the present invention could easily be implemented in the ASIC present at the network elements. In this way, the number of external components is importantly reduced, since the components generally used for implementing the transport of the OH data on an in-band channel are eliminated. This results in a low cost solution.

In addition, CDR 14 is importantly simplified, because there is no need to locally generate $f_{ch}$, it being present in the combined input signal.

The first and second 3R units 1 and 3 may be each equipped with a frequency agile PLL as in the above-mentioned patent application Ser. No. 09/218053. This solution presents the advantage that the frequency agile PLL is capable of recovering the clock over a wide band of frequencies, making it possible to phase look signals of various frequencies that are not multiple integers of each-other, using a same PLL.

It is to be mentioned that this out of band vehicle is most suitable for metropolitan network where the distances between the sites are shorter so that the OH channel does not need to be amplified.

We claim:

1. An out of band vehicle for an optical network carrying traffic data, for transporting overhead (OH) data between 3R network elements, irrespective of the format or/and rate of said OH data, comprising:
   at a transmit side of a 3R network element,
      a mixer for mixing said OH data with a local clock of frequency $f_{ch}$, to generate an up-converted OH data at said frequency $f_{ch}$;
      a summing circuit for combining said traffic data with said up-converted OH data to obtain a combined output signal; and
      a light source for launching said combined output signal over a transmission link, wherein said frequency $f_{ch}$ is selected in a null of the spectrum of said traffic data.

2. An out of band vehicle for an optical network carrying traffic data, for transporting overhead (OH) data between 3R network elements, irrespective of the format or/and rate of said OH data, comprising:
   at a receive side of a 3R network element,
      means for detecting a combined input signal received over a transmission link to obtain an electrical variant of said combined input signal;
      means for recovering a dock of frequency $f_{ch}$ from said electrical variant, wherein said frequency $f_{ch}$ occurs in a null of the spectrum of said traffic data, and
      a mixer for mixing said electrical variant with said clock of frequency $f_{ch}$, to obtain a plurality of components at frequencies around said frequency $f_{ch}$.

3. An out of band vehicle as claimed in claim 2, wherein said 3R network element further comprises a low speed receiver for recovering said overhead data from said plurality of components.

4. An out of band vehicle as claimed in claim 1, wherein said traffic data is NRZ encoded.

5. An out of band vehicle as claimed in claim 1, wherein said traffic data is multi-level encoded.

6. An out of band vehicle as claimed in claim 2, wherein said means for recovering is a clock and data recovery circuit, for extracting said frequency $f_{ch}$ from said electrical variant, without need of a local clock generator.

7. A transparent transceiver comprising, at the transmit side:

means for providing traffic data at a rate R Gb/s;

a clock for providing a local clock of frequency $f_{ch}$;

a mixer for mixing overhead OH data with said local clock to generate an upconverted OH data at said frequency $f_{ch}$;

a summing circuit for combining said traffic data with said up-converted OH data to obtain a combined output signal; and a light source for launching said combined output signal over a transmission link, wherein the frequency $f_{ch}$ is equal in value with said rate R.

8. A transparent transceiver as claimed in claim 7, further comprising, at the receive side:

means for detecting a combined input signal received over a transmission link to obtain an electrical variant of said combined input signal;

means for recovering said traffic data and said local clock from said electrical variant; and a mixer for mixing said electrical variant with said local clock to obtain a plurality of components at frequencies around frequency $f_{ch}$.

9. A transparent transceiver as claimed in claim 8, further comprising a low speed receiver for recovering said overhead data from said plurality of components.

10. A method of communicating traffic and overhead (OH) data between a first and a second 3R network elements comprising:

selecting a frequency $f_{ch}$ in a null of the spectrum of said traffic data;

at said first 3R network element, up-converting said OH at said frequency $f_{ch}$, summing same with said traffic data to obtain a combined data and transmitting said combined data from said first to said second 3R network element; and at said second 3R network element, down-converting said combined data from said frequency $f_{ch}$ to obtain said OH data.

* * * * *